UNITED STATES PATENT OFFICE.

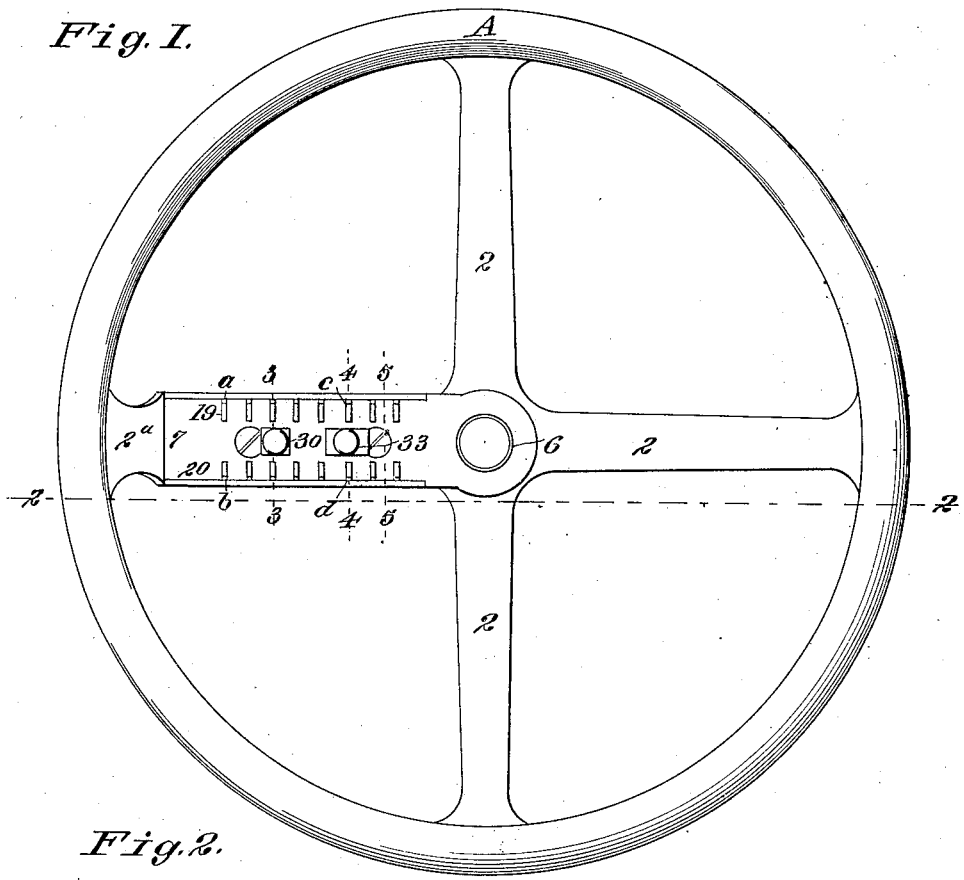
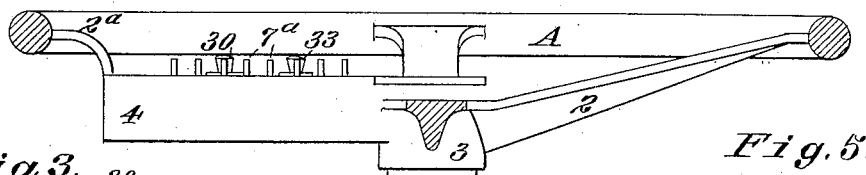
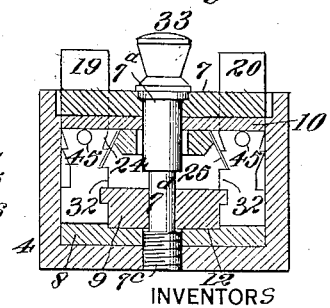

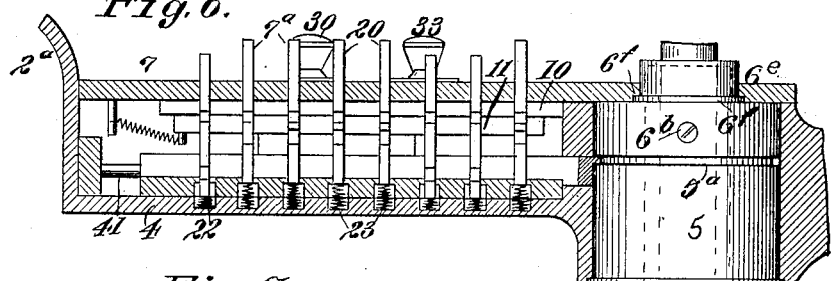

LEE RIAL AND WILLIAM HEBERN, OF SAN FRANCISCO, CALIFORNIA; SAID HEBERN ASSIGNOR OF ONE-FOURTH TO E. J. McLAUGHLIN AND ONE-FOURTH TO JOSEPH F. SULLIVAN, BOTH OF SAN FRANCISCO, CALIFORNIA.

STEERING-WHEEL MOUNTING.

1,350,841.      Specification of Letters Patent.      Patented Aug. 24, 1920.

Original application filed October 29, 1917, Serial No. 199,003. Divided and this application filed January 29, 1919. Serial No. 273,902.

*To all whom it may concern:*

Be it known that we, LEE RIAL and WILLIAM HEBERN, citizens of the United States, residing at San Francisco, in the county of San Francisco and State of California, have invented new and useful Improvements in Steering-Wheel Mountings, of which the following is a specification.

This invention relates to a steering wheel mounting and is a divisional application of our co-pending invention entitled "Steering wheel lock", filed October 29, 1917, Serial No. 199,003.

One of the objects of the present invention is to provide a simple, substantial locking mechanism, whereby it becomes possible to lock or unlock the steering wheel with relation to the steering column of an automobile or other vehicle, thus making it possible to render the steering wheel inoperative, and furthermore, prevent unauthorized persons from appropriating or using same. Another object of the invention is to provide a steering wheel column of novel construction and also to provide means operable in unison with the lock for securing the steering wheel against vertical movement on the column. Further objects will hereinafter appear.

The invention consists of the parts and the construction and combination of parts as hereinafter more fully described and claimed, having reference to the accompanying drawings, in which—

Figure 1 is a plan view of an ordinary steering wheel, showing the application of the invention.

Fig. 2 is a side elevation of same, partly in section, said section being taken on the line 2—2 of Fig. 1.

Fig. 3 is an enlarged cross section on line 3—3 of Fig. 1.

Fig. 4 is an enlarged cross section on line 4—4 of Fig. 1.

Fig. 5 is an enlarged cross section on line 5—5 of Fig. 1.

Fig. 6 is a longitudinal, vertical section through one side of the locking mechanism.

Fig. 7 is a similar section taken directly through the center of the locking mechanism.

Fig. 8 is a plan view, showing the cover plate, upper bearing plate and the releasing plate removed.

Fig. 9 is a bottom view of the cover plate, bearing plate and releasing plate, showing the three plates assembled and the normal positions maintained between the same.

Fig. 10 is a perspective view of one of the keys employed.

Fig. 11 is a perspective view of a portion of the locking bolt.

Fig. 12 is a detail plan view of the collar, showing a split bushing interposed between the steering column and the collar.

Fig. 13 is a vertical section through the collar, showing it raised by the interposition of a plurality of washers.

Referring to the drawings in detail, A indicates the rim of an ordinary steering wheel, 2 the spokes, and 3 the hub. Formed integral with one of the spokes, as shown at 2ª, is a lock housing or casing 4, and forming a covering for said housing and a collar 5, secured upon the steering column 6, is a plate 7. Slidably mounted on a bearing plate 8 secured in the bottom of the casing is a locking bolt 9, and slidably mounted on a bearing plate 10 secured to the cover plate 7 is a releasing plate 11.

Formed as a guideway for the bolt 9 in the bearing plate 8 is a recessed slotted section 12, and formed on each side of the locking bolt is an outwardly projecting flange 13 which is notched, as shown at 14, along the whole length of the bolt and on each side of same. Formed in the bottom bearing plate and on each side thereof are eight slots, such as shown at 15 and 16, and formed in the upper bearing plate and also in the cover plate 7 is a similar number of alined slots 17 and 18. Adapted to be received by the alined slots 15 and 17 are eight vertically positioned key members 19, and adapted to be received by the alined slots 16 and 18 are eight key members 20. The keys are sufficiently long to project a suitable distance above the cover plate 7, as shown at 7ª, (see Figs. 1, 2 and 6) and may, therefore, be readily manipulated when the locking mechanism is to be released or locked.

In the bottom section of the casing 4 and also in the lower bearing plate 8, in alinement with each set of slots 15 and 16, are chambers 22, and adapted to be housed by said chambers and interposed between the lower end of each key and the bottom section of the casing is a coil spring 23. These coil springs normally serve the function of supporting each key in a raised or projected position and they also serve the function of raising the keys when they are released by the releasing plate 11, as will hereinafter be described.

Each side of each key is notched, as shown in Figs. 3, 4, 5 and 10. One notched side may be called the combination side while the opposite side may be called the free side. The free side of each key is provided with notches, each as shown at 24, 25 and 26, while the combination side of each key is provided with two notches, such as shown at 27 and 28. The upper notches 24 and 27 are formed on the same plane and are provided for the purpose of receiving a locking spring, such as shown at 29. There is one locking spring for each key (sixteen in all) and these springs are secured to each side of the releasing plate 11, and as the releasing plate normally assumes the position shown in Fig. 9, which maintains each spring in alinement with the key, it can readily be seen that depression of any individual key against the tension of the springs 23 will permit a spring 29 to engage one or another of the notches 24 and 27 and lock the key against upward movement. The release of a key thus locked can only be accomplished by moving the sliding plate in the direction of arrow $a$ by means of a knob 30 secured to the plate, as shown in Fig. 7; this movement of the sliding plate and the springs carried thereby being permitted as the cover plate is slotted, as at 31, to allow such movement. The sliding movement thus transmitted to the plate moves the springs 29 out of alinement with each key laterally and, therefore, disengages each spring and permits the keys to return to normal raised position, due to the tension of the springs 23.

Any number of keys may be employed in the combination for the purpose of releasing or locking the bolt 9. The keys thus employed for locking or releasing the bolt are turned to the position shown in Figs. 3 and 4; that is, the combination sides of the keys are presented toward the slotted flanges 13 of the locking bolt. The keys that are not employed in the combination remain in their normal position and present their combination sides outwardly toward the sides of the casing, as shown in Fig. 5.

In actual operation, supposing the keys marked $a$, $b$, $c$ and $d$ (see Fig. 1) are employed as locking members. Then it is only necessary to depress said keys, as shown in Fig. 4, to permit the bolt to be retracted with relation to a slot $5^a$ formed in the collar 5. This is accomplished as follows: By referring to Fig. 4 it will be seen that depression of the keys $c$ and $d$ has lowered them to a point where the upper notches 27 have become engaged and locked by the springs 29. It can also be seen that the lower notches 28 have assumed a position below the slotted flanges 13 of the bolt which permits the bolt to travel freely.

The other position of the combination keys is shown in Fig. 3. They are here in the raised position and as such form locks for the bolt, as the lower ends of the keys are in a position where they enter the slots 14 of the flanges 13 on the locking bolt. The bolt cannot, therefore, be moved before the keys $a$ and $b$ in Fig. 3 have been depressed, nor can the bolt be moved if any other keys are depressed but the four specified, as the depression of keys not in the combination would cause a lug 32, on the free side of the key (see Fig. 5) to enter one of the channels formed in the flanges 13 of the bolt. Therefore it is essential that no keys but those employed in the combination, that is, keys $a$, $b$, $c$ and $d$ be depressed, as it will otherwise be impossible to move the bolt. The moment the depression of the combination keys has taken place it becomes possible to move the bolt by means of a knob 33 in the direction of arrow $b$ (see Fig. 7). This movement is possible as the flanges 13 on the bolt are in alinement with the lower notches, formed on the free sides of the keys, that are not employed in the combination and also because the flanges 13 are in alinement with the notches 28 formed in the combination keys as these have been depressed as described.

Movement of the bolt for retraction is permitted the moment the knob is pulled in the direction of the arrow $b$, as shown. The steering wheel is in this manner released with relation to the collar and the steering column and it also becomes possible to lock the bolt in this released position merely by releasing the combination keys that have been depressed; this being accomplished, as before described, by moving the knob and connected sliding plate 11 in the direction of arrow $a$.

The bolt, when locked in the released position, cannot be released until the combination keys are again depressed, nor can it be released or engaged with the collar until the wheel is turned to a position where the bolt is in alinement with the notch $9^a$ formed in the collar. It is, therefore, essential, when desiring to lock the wheel with relation to the collar and column, to first depress the combination keys and then turn the wheel to a position where the bolt will register with the notch $9^a$ to permit the bolt to enter and lock, the bolt being locked and secured in the locked position by again releasing the combination keys through a movement of the sliding plate. It is, therefore, essential to know the combination of the lock if it is desired to lock the wheel when the bolt is retracted to releasing position and also if it is desired to release the wheel to unlock it with relation to the steering column. Neither operation can be performed without knowledge of the combination.

The manner of securing the collar 5 to the steering column and also the manner in which the cover plate 7 is secured to the casing are important features of the present invention. The collar 5 is first secured to the column 6 by means of a key 6ª, then by a screw 6ᵇ, and then by the cover plate 7, the cover plate being secured to the casing by means of two screws 7ᵇ. These screws pass through the cover plate 7, the upper bearing plate 10, the releasing plate 11, and the bolt 9 and are screwed into the lower bearing plate 8 in the bottom section of the casing, as shown at 7ᶜ. The center portion of each screw is turned down to reduce the diameter, as shown at 7ᵈ. The reduced portions thus secured extend through slots 9ᵉ, formed in the bolt, and as each slot is enlarged to the full diameter of the screws, as shown at 9', the screws can only be removed when the bolt is moved into a position where the enlarged portions 9' will line up with the screws. This position is only assumed when the bolt is midway between a complete locking or a complete releasing position. Therefore it is necessary to know the combination of the lock so that the bolt may be released and moved to this position before it is possible to remove the screws which secure the cover plate 7 in place. It is therefore also impossible to lift the wheel or remove it from the steering column as it is first necessary to remove the cover plate and bolt before it is possible to lift the wheel off of the collar.

The wheel proper is also secured against upward movement on the collar by forming an annular groove therein, as shown at 5ª. A lip 9ᵈ, formed on the forward end of the bolt, normally projects into this groove when the bolt is retracted and is fully projected into the slot 9ª when the bolt is moved forward to locking position, the bolt being normally retained in the locking position by a spring 40 interposed between the rear end of the casing and the bolt, and the rearward movement of the bolt, when retracted, is limited by a stop pin 41 secured to the rear end of the casing. This pin is of considerable importance as it prevents the bolt from moving so far back that the lip 9ᵈ might move out of engagement with the annular groove 5ª; also it provides a positive stop which prevents the bolt from being moved into a position where the slots 14, formed in the flanges 13, might be out of alinement with the keys. It is necessary that an absolute alinement should be maintained between the keys and the slots 14 on the bolt, both when the bolt is retracted and extended, as it would otherwise be difficult to lock the bolt in either the extended or retracted position.

The sliding plate 11 may be secured to the upper bearing plate 10 in any suitable manner, but preferably as here shown by a cross bar 42 and a screw 43, the cross bar and screw permitting a sliding movement of the releasing plate, when desired, and also permitting retraction of the releasing plate to normal position by means of a spring 44. This spring is attached at one end to the cover plate and at the opposite end to the releasing plate.

The downward movement of the vertically positioned keys which coöperate with the locking bolt is, as before stated, limited by the bottom section of the casing. The upward movement is limited entirely by pins 45 extending through the keys which are adapted to engage the underside of the upper bearing plate 10. The keys, when raised, will all assume a normal plane and will also assume a normal plane if they should all be depressed, as their movement, both in an upward and downward direction, is positively limited; the actual movement in practice being approximately one-eighth of an inch while the extreme movement of the bolt proper is one-quarter of an inch. The forward end of the bolt which enters the slotted portion of the collar is, therefore, preferably slightly tapered, to permit it to act as a wedge to tightly lock the wheel with relation to the collar and steering column and also to permit it to automatically take up the slight amount of wear which will naturally take place through continuous use.

The steering wheel as a whole is absolutely tamper-proof because the combination lock is so constructed that it cannot possibly be opened without knowledge of the combination and also it is impossible to wedge, clamp or otherwise lock the wheel with relation to the steering column as the post or housing 6ᶜ inclosing the lower part of the steering column, projects up into a recess formed in the bottom of the collar, as shown at 6ᵈ. It can also be seen that it becomes impossible to wedge the hub of the wheel with relation to the collar as the lower end of the hub projects below the collar, while the upper end of the steering column is entirely covered by the plate 7, and it is also impossible to clamp the wheel with relation to the collar or column as a cap 6ᵉ forms a covering for the upper end of the column; and while it is turnably mounted thereon it is secured against endwise removal by the cover plate, due to the fact that its lower edge is flanged, as shown at 6ᶠ, to engage beneath the plate 7.

Every precaution has been taken to guard against tampering or temporarily disabling the mechanism, and as it is otherwise comparatively simple and substantial in construction it presents no difficulty as regards operation to the person who is familiar with the combination. The necessity of carrying a key and the inconveniences connected therewith if a key is lost, are entirely obviated in the present case as no key can be removed. It may also be stated that the combination can be more readily operated than a key-actuated lock, particularly when it is dark, as an individual knowing the combination can tell by the touch of the keys which should be depressed for the purpose of operating the combination.

The wheel here shown can readily be fitted to the steering column of any standard automobile even though the collar is too large or too short. If it is too large in diameter, it is only necessary to interpose a split bushing, such as shown in Fig. 12, and if too short, it is only necessary to interpose a few washers, such as shown in Fig. 13. It can, therefore, be readily applied wherever desired because no change in construction is necessary.

From the foregoing description it should be appreciated that means have been provided for preventing the theft or use of an automobile by any unauthorized person as it is possible to release the steering wheel from the column or post, thereby rendering it impossible to drive the car or tow it away. The wheel is, furthermore, attached to the steering column in such a way that it is locked at all times which makes it difficult, if not impossible, to remove the wheel unless the combination is known or the wheel is entirely mutilated. The locking mechanism provided is such that the owner can change the combination at his own pleasure, but it should be understood that such a change and combination cannot be made unless the present combination is known as the screws that hold the cover plate on the lock are so constructed that they cannot be removed while the bolt is locked in either the locked or released position. The bolt must necessarily be moved to a central or neutral position halfway between the two locking positions before the screws can be removed.

To change the combination it is only necessary to remove the cover plate as described and then simply reverse the position of the keys, if it is desired to add to the combination, and reverse the other keys that may have been in the former combination, if desired. Care must, of course, be taken to note and remember all keys that are placed with the combination side toward the bolt. As this change in combination can be made by merely removing the cover plate, it can be seen that comparatively little time is required and that a change may be made as often as desired.

Another feature that should be noted is the fact that the slots formed in the cover plate are a little larger than the slots formed in the two bearing plates. This is of great importance as all wear will be taken up by the bearing plates, thereby saving the cover plate and preventing a too close observer from detecting which keys are being used.

The materials and finish of the several parts of the device may be such as the experience and judgment of the manufacturer may dictate; and while we have here shown a locking mechanism applied to a steering wheel we wish it understood that it may be applied wherever a lock may be required.

Having thus described our invention, what we claim and desire to secure by Letters Patent is—

1. In combination with the steering column of a vehicle, of a collar fixed thereon and formed with a circumferential groove interrupted by a slot, a wheel journaled on the collar, a lock casing extending from the hub of the wheel and communicating with the groove and slot of the collar, a locking bolt slidably arranged in the casing and engageable in the slot and groove of the collar, a cover plate for the casing having an extension overlying the hub and collar and formed with an opening through which the steering column projects, and a cap inclosing the projecting steering column and having a base flange on which the cover plate extension rests for securing the cap in position.

2. In combination with the steering column of a vehicle, of a collar fixed thereon and formed with a circumferential groove interrupted by a slot, a wheel journaled on the collar, a lock casing extending from the hub of the wheel and communicating with the groove and slot of the collar, a locking bolt slidably arranged in the casing and engageable in the slot and groove of the collar, a cover plate for the casing having an extension overlying the hub and collar and means for securing the cover plate operative, said means under the control of said locking bolt.

3. In combination with the steering column of a vehicle, of a collar fixed thereon and formed with a circumferential groove interrupted by a slot, a wheel journaled on the collar, a lock casing extending from the hub of the wheel and communicating with the groove and slot of the collar, a locking bolt slidably arranged in the casing and engageable in the slot and groove of the collar, a cover plate for the casing having an extension overlying the hub and collar, and means under the control of the bolt for securing the cover plate operative and adapted to be rendered inoperative only when the locking bolt is disposed intermediate its limits of movement.

4. The combination with the steering column on a vehicle, of a grooved collar secured on the column, a steering wheel turnably mounted on the collar, a combination lock secured to the wheel, a bolt carried by the lock adapted to be projected or retracted with relation to the grooved collar to lock or unlock the wheel against turning movement about its collar, means actuated by the combination lock for locking the bolt against movement both in the projected and in the retracted position, and means also actuated by the combination lock for locking the wheel against vertical movement on the collar.

5. The combination with the steering column on a vehicle, of a grooved collar secured on the column, a steering wheel turnably mounted on the collar and formed with radiating spokes, a lock housed in one of the spokes of the wheel, a bolt carried by the lock adapted to be projected or retracted with relation to the grooved collar to lock or unlock the wheel against turning movement about its collar, means actuated by the combination lock for locking the bolt against movement both in the projected and in the retracted position, and means on the bolt for locking the wheel against vertical movement, said means being operable whether the bolt is projected or retracted.

6. The combination with the steering column on a vehicle, of a collar secured on the column, a steering wheel turnably mounted on the collar, a lock, a casing forming a spoke of the wheel and housing the lock, a bolt actuated by said lock and movable in the spoke like casing for locking or unlocking the wheel against turning movement about the collar, and means also actuated by the combination lock for locking the wheel against vertical movement on the collar, said means comprising an annular groove formed in the collar and a tongue on the bolt projecting into the groove.

7. The combination with the steering column on a vehicle, of a collar secured on the column, a steering wheel turnably mounted on the collar, a lock, a bolt carried by the lock adapted to be projected or retracted with relation to the collar to lock or unlock the wheel against turning movement about the collar, a cover plate for the lock, an extension on said plate adapted to cover the hub of the wheel and the collar, said steering column projecting through the extension, and removable means inclosing the projecting steering column and held in place by said extension.

8. The combination with the steering column on a vehicle, of a grooved collar secured on the column, a steering wheel turnably mounted on the collar, a combination lock secured to the wheel, a bolt carried by the lock adapted to be projected or retracted with relation to the grooved collar to lock or unlock the wheel against turning movement about the collar, a plurality of key members permanently retained in the lock, means on said keys for locking the bolt against movement whether in the projected or retracted position, a cover plate for the lock through which the keys project, an extension on the cover plate adapted to cover the hub of the wheel and the collar, means for securing the cover plate against removal, and means on the bolt for locking said securing means against removal.

9. The combination with the steering column on a vehicle, of a grooved collar secured on the column, a steering wheel turnably mounted on the collar, a combination lock secured to the wheel, a bolt carried by the lock adapted to be projected or retracted with relation to the grooved collar to lock or unlock the wheel against turning movement about the collar, a plurality of key members permanently retained in the lock, means on said keys for locking the bolt against movement whether in the projected or retracted position, a cover plate for the lock through which the keys project, an extension on the cover plate adapted to cover the hub of the wheel and the collar, means for securing the cover plate against removal, means on the bolt for locking said securing means against removal, means for securing the keys when moved to locking position, and means for releasing the same.

10. The combination with the steering column on a vehicle, of a grooved collar secured on the column, a steering wheel turnably mounted on the collar, a combination lock secured to the wheel, a bolt carried by the lock adapted to be projected or retracted with relation to the grooved collar to lock, or unlock the wheel against turning movement about the collar, a plurality of key members permanently retained in the lock, means on said keys for locking the bolt against movement whether in the projected or retracted position, a cover plate for the lock through which the keys project, an extension on the cover plate adapted to cover the hub of the wheel and the collar, means for securing the cover plate against removal, means on the bolt for locking said securing means against removal, means for securing the keys when moved to locking position, means for releasing the same, said means comprising a sliding plate, and a plurality of springs secured to the plate, one for each key.

In testimony whereof we have hereunto set our hands in the presence of two subscribing witnesses.

LEE RIAL.
WILLIAM HEBERN.

Witnesses:
H. W. REED,
F. H. MALLOY.